UNITED STATES PATENT OFFICE.

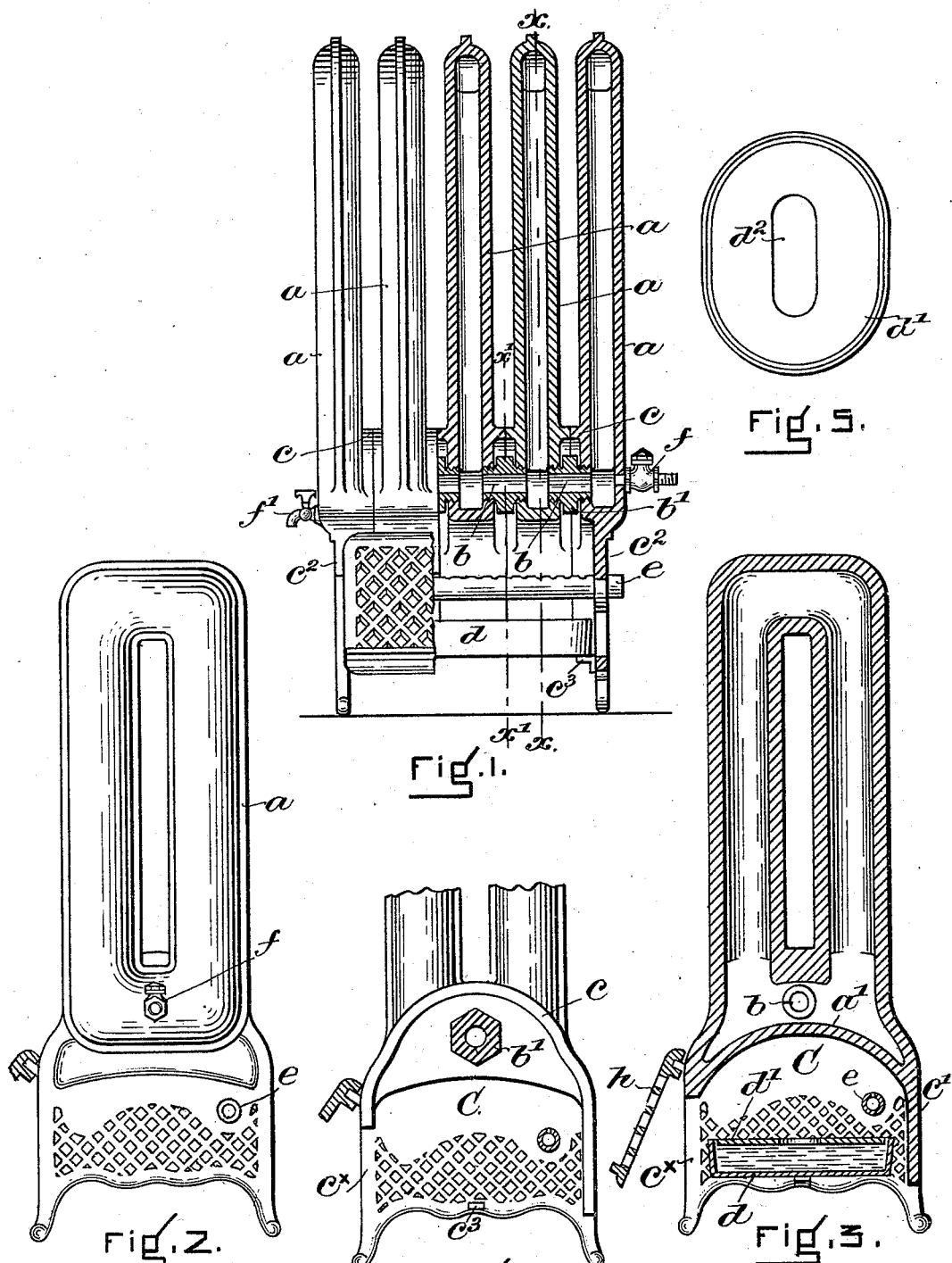

ROBERT S. CALEF, OF BOSTON, MASSACHUSETTS.

HEATING APPARATUS.

SPECIFICATION forming part of Letters Patent No. 553,205, dated January 14, 1896.

Application filed February 11, 1895. Serial No. 537,850. (No model.)

*To all whom it may concern:*

Be it known that I, ROBERT S. CALEF, of Boston, county of Suffolk, State of Massachusetts, have invented an Improvement in Heating Apparatus, of which the following description, in connection with the accompanying drawings, is a specification, like letters on the drawings representing like parts.

This invention relates to a heating apparatus, usually portable, of the class represented by United States Patent No. 505,713, issued September 26, 1893, to Thomas J. Maw.

The present invention consists in various improvements on the construction shown in the said Maw patent, whereby the same may be more cheaply constructed, and whereby an apparatus of different capacity may be made without requiring different patterns or castings.

In the drawings, Figure 1, in elevation and partial section, shows an apparatus embodying my invention; Fig. 2, a right-hand end elevation of the apparatus shown in Fig. 1; Fig. 3, a vertical section on the dotted line $x$ $x$, Fig. 1; Fig. 4, a vertical section on the dotted line $x'$ $x'$, Fig. 1; and Fig. 5, a top or plane view of the moisture-supply tank, to be described.

Referring to the drawings, in the particular embodiment of my invention selected and shown, $a$ $a$ are a series of hollow radiator-sections, each preferably provided with an arching or concave bottom $a'$ (see Fig. 3) and above the said bottom made in the form of a loop, as shown, to provide for ready circulation of heating fluid therein. In the preferred embodiment of my invention these sections $a$ $a$ are joined one to another and placed in open communication one with the other by means of suitable unions $b$ $b$, each of which is shown as provided at its opposite ends with right and left hand threads, so that when rotated it will act to draw adjacent sections toward each other. These unions $b$ $b$ are preferably made square at their middle, as shown at $b'$, to enable them to be turned by means of a usual wrench.

In the preferred embodiment of my invention to conceal the unions $b$ $b$ from view and also to form a tight joint between adjacent sections, I have provided the latter with radial arching flanges $c$, which, when the sections are clamped together, abut, as in Fig. 1, to form a tight arch to a heating-chamber C beneath the several sections and formed by the latter collectively, the said sections at the back of the apparatus being provided with tail portions $c'$, which extend downward to a considerable distance and abut one against the other to form the back of the heating-chamber.

The perforated ends $c^2$ of the heating-chamber are formed upon the endmost sections $a$ $a$, as shown in the drawings, said end sections, in the present instance, being provided at their inner sides with suitable shelves $c^3$, upon which may be placed a reservoir $d$ containing water to supply moisture to the heat given off by the apparatus.

A supply pipe or burner $e$ for gas or other suitable fluid, constituting one form of heat-generator, is shown as arranged in the heating-chamber C, but near the back thereof, the front of the said chamber being open at $c^\times$, as shown.

One of the end sections $a$ $a$ is provided with a filling-opening controlled by a suitable valve $f$, and preferably the opposite end section is provided with a suitable gage-valve $f'$, as shown.

For use the several connected sections $a$ $a$ are filled with water until it reaches a level, (indicated at the gage-valve $f'$.) Heat supplied by the heat-generator first rises in the arched or dome-like roof of the heating-chamber C, and first heats the water in the bottoms of the sections $a$ $a$, vaporizing the latter to circulate in and heat the roof portions of the said sections, the said heat practically working into contact with the said roof toward the open front of the chamber, from which it passes out to directly heat the room in which the apparatus is placed.

A foot-rest and screen $h$ is shown as mounted at the front of the apparatus.

The end sections $a$ $a$ are substantially alike and can be made from the same pattern, the holes for the heat-generator being afterward drilled or they may be cast at each side of their respective sections and only one of them used. The intermediate sections $a$ $a$ are exactly alike and any number may be used to make up an apparatus of any desired length or capacity.

By means of the unions $b\ b$ adjacent sections may be firmly united or clamped together, so that a perfectly tight roof or back to the heating-chamber may be had, the unions at the same time being concealed from view.

The moisture or vapor supply pan $d$ is preferably filled with water, and upon the surface of the water I place a float $d'$ (shown in Fig. 5) of suitable material and provided with one or more openings $d^2$, through which the evaporation may take place, the area of the opening $d^2$ determining the rate of evaporation and the quantity of moisture supplied to the heated air.

My invention is not limited to the particular construction of apparatus herein shown, for it is evident that the same may be varied without departing from the spirit and scope of my invention.

I claim—

1. A portable heating apparatus of the class described, consisting of a series of fluid containing sections arranged side by side, unions joining the said sections, and flanges on adjacent sections extending over the tops of and inclosing the said unions, and with the said sections forming a suitable heating chamber, and a heat generator within the said chamber, substantially as described.

2. A heating apparatus of the class described, consisting of a series of fluid-containing sections, arranged side by side, and having their lower ends provided with transverse arches and downwardly extended tail portions to form the top and back of an open-sided heating chamber and a heat generator within the said chamber, the whole constituting a portable, sectional heating apparatus capable of enlargement at will by the addition of similar sections, substantially as described.

3. A heating apparatus of the class described, consisting of a series of fluid-containing sections, arranged side by side, and having abutting arches at their lower ends to form the top of an open-sided heating chamber and also having abutting tail pieces to form the back of such chamber, heating chamber ends on the endmost sections, and a heat generator within the said chamber, the whole constituting a portable, sectional heating apparatus, substantially as described.

In testimony whereof I have signed my name to this specification in the presence of two subscribing witnesses.

ROBERT S. CALEF.

Witnesses:
FREDERICK L. EMERY,
JOHN C. EDWARDS.